(12) United States Patent
Ghang et al.

(10) Patent No.: US 7,209,158 B2
(45) Date of Patent: Apr. 24, 2007

(54) SCANNING LINE ALIGNMENT COMPENSATION APPARATUS AND METHOD FOR A LASER PRINTER

(75) Inventors: Goo-soo Ghang, Yongin (KR); Jung-tag Gong, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 320 days.

(21) Appl. No.: 10/766,885

(22) Filed: Jan. 30, 2004

(65) Prior Publication Data

US 2004/0183893 A1   Sep. 23, 2004

(30) Foreign Application Priority Data

Feb. 5, 2003   (KR) ...................... 10-2003-0007277
May 30, 2003   (KR) ...................... 10-2003-0034948

(51) Int. Cl.
   *B41J 2/435*   (2006.01)
(52) U.S. Cl. ...................... 347/235; 347/250
(58) Field of Classification Search ........ 347/233–237, 347/246–250
   See application file for complete search history.

(56) References Cited

U.S. PATENT DOCUMENTS 5,966,231 A   10/1999   Bush et al.
6,124,948 A   9/2000   Kamioka
6,198,495 B1 *   3/2001   Sawada ...................... 347/233
2001/0009471 A1   7/2001   Ito et al.

FOREIGN PATENT DOCUMENTS

DE   198 08 937   10/1998
EP   0 620 671   10/1994
EP   0 810 768   12/1997

OTHER PUBLICATIONS

European Search Report dated Nov. 29, 2006.

* cited by examiner

*Primary Examiner*—Hai Pham
(74) *Attorney, Agent, or Firm*—Staas & Halsey LLP

(57) ABSTRACT

A scanning line alignment compensation apparatus and method for a laser printer. The scanning line alignment compensation apparatus includes a laser scanning unit (LSU) having a first laser diode and a second laser diode and at least one sync signal detection sensor that generates a sync signal based on at least one of the first laser diode and the second laser diode based on selectively driving either of the first laser diode and the second laser diode, and generates at least one offset sync signal having first and second sensor detection periods based on the sync signal generated based on the at least one of the first laser diode and the second laser diode; a compensation unit compensating for first and second video data input in synchronization with a video clock based on the first and second sensor detection periods; and a laser diode control unit outputting control signals to control the first laser diode and the second laser diode based on the compensated first and second video data.

16 Claims, 13 Drawing Sheets

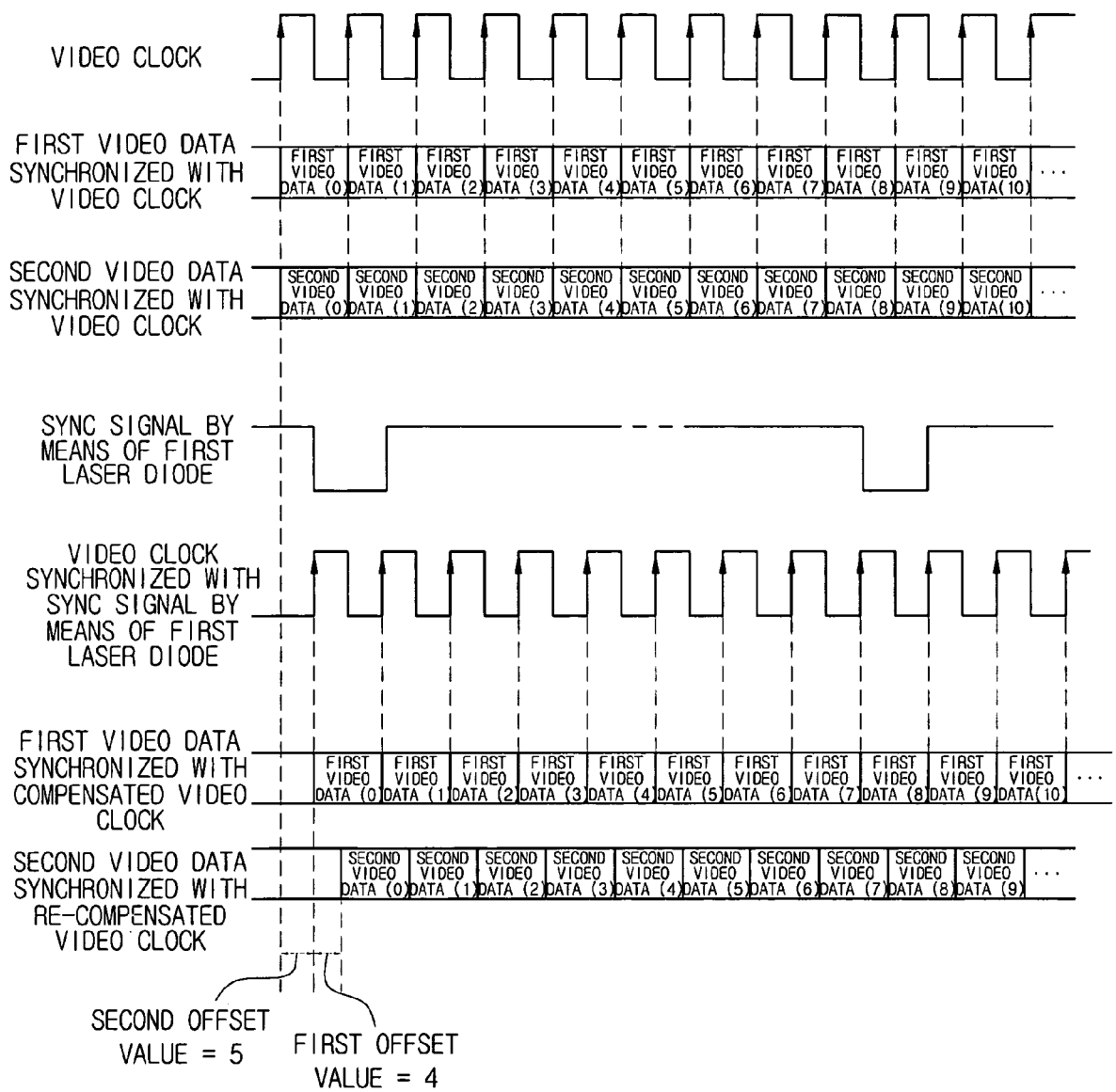

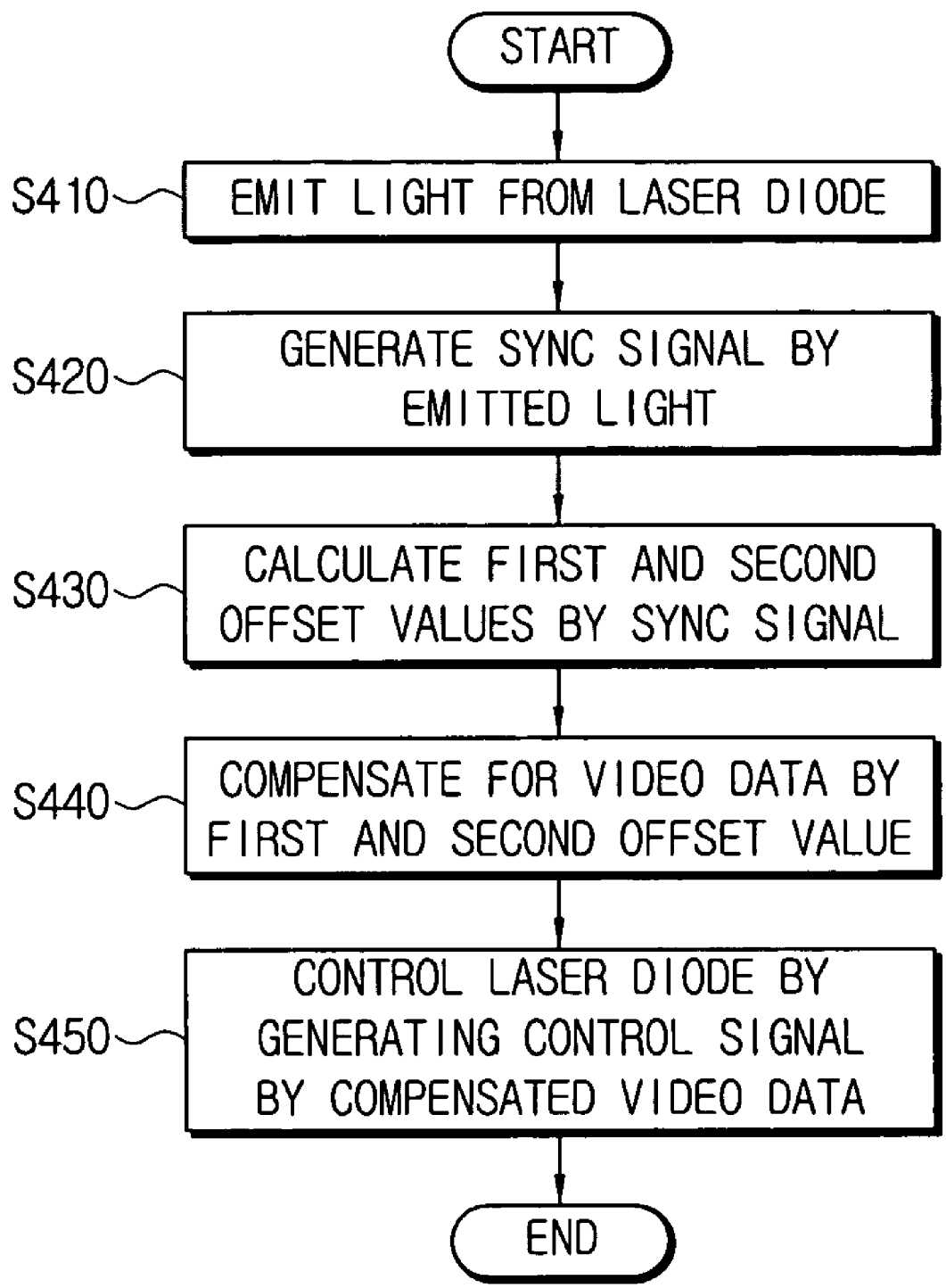

SCANNING LINE ALIGNMENT COMPENSATION APPARATUS AND METHOD FOR A LASER PRINTER

CROSS-REFERENCE TO RELATED APPLICATIONS

This application claims the benefit of Korean Patent Application Nos. 2003-7277 and 2003-34948, dated Feb. 5, 2003 and May 30, 2003, in the Korean Intellectual Property Office, the disclosures of which are incorporated herein by reference.

BACKGROUND OF THE INVENTION

1. Field of the Invention

The present invention relates to a scanning line alignment compensation apparatus and method for a laser printer, and, more particularly, to a scanning line alignment compensation apparatus and method for a laser printer that compensates for a vertical error between scanning lines generated due to the positional difference between two laser diodes of a laser scanning unit in a two-line optical scanning laser printer.

2. Description of the Related Art

Laser printers are widely available, and, due to the development of laser printer technology, two-line optical scanning-type laser printers, rather than one-line optical scanning-type laser printers, have been widely adopted.

The two-line optical scanning-type laser printer has a print speed much greater than that of the one-line optical scanning-type laser printer.

For the two-line optical scanning-type laser printer, however, two laser diodes are required to scan two lines at a time, resulting in the occurrence of a positional difference between the respective laser diodes. This causes an error to be produced in a vertical alignment of two lines, although the print speed is improved.

SUMMARY OF THE INVENTION

An aspect of the invention is to solve at least the above-identified problems and/or disadvantages and to provide at least the advantages described hereinafter.

Another aspect of the present invention is to provide a scanning line alignment compensation apparatus and method for a laser printer that compensates for a vertical error between scanning lines that is generated due to the positional difference between two laser diodes in a two-line optical scanning laser printer.

Additional aspects and/or advantages of the invention will be set forth in part in the description which follows and, in part, will be obvious from the description, or may be learned by practice of the invention.

To achieve the above and/or other aspects of the present invention, there is provided a scanning line alignment compensation apparatus for a laser printer, including a laser scanning unit (LSU) having a first laser diode and a second laser diode and at least one sync signal detection sensor that generates a sync signal based on at least one of the first laser diode and the second laser diode based on selectively driving either of the first laser diode and the second laser diode, and generates at least one offset sync signal having first and second sensor detection periods based on the sync signal generated based on the at least one of the first laser diode and the second laser diode; a compensation unit compensating for first and second video data input in synchronization with a video clock based on the first and second sensor detection periods; and a laser diode control unit outputting control signals to control the first laser diode and the second laser diode based on the compensated first and second video data.

The compensation unit includes a counting clock generation unit generating a counting clock using an inverter; a first offset value calculation unit using the counting clock to calculate a first offset value that is a difference between the first sensor detection period, which is based on driving both the first laser diode and the second laser diode, and the second sensor detection period, which is based on the selective driving of the first laser diode and the second laser diode; a second offset value calculation unit using the counting clock to calculate a second offset value, which is a difference between the sync signal generated based on the at least one of the first laser diode and the second laser diode and the video clock; and a video data compensation unit compensating for a delay of the first and second video data based on the first offset value and the second offset value.

When two sync signal detection sensors are used, the first offset value is calculated by obtaining a (1-1)-th offset value by counting a difference between a start point of the first sensor detection period and a start point of the second sensor detection period, based on the driving of only the first laser diode, and obtaining a (1-2)-th offset value by counting a difference between a start point of the first sensor detection period and a start point of the second sensor detection period, based on the driving of only the second laser diode.

When one sync signal detection sensor is used, the first offset value is calculated by obtaining a (1-1)-th offset value by counting the first sensor detection period, and obtaining a (1-2)-th offset value by counting the second sensor detection period, based on driving either of the first laser diode and the second laser diode.

When one sync signal detection sensor is used, the first offset value is calculated by obtaining a (1-1)-th offset value by counting a difference between a start point of the first sensor detection period and a start point of the second sensor detection period, based on the driving of only the first laser diode, and obtaining a (1-2)-th offset value by counting a difference between a start point of the first sensor detection period and a start point of the second sensor detection period, based on the driving of only the second laser diode.

The first video data are compensated for based on compensating for the video clock by the second offset value, and the second video data are compensated for based on compensating for the video clock by the first offset value and the second offset value.

In addition to achieve the above and/or other aspects of the present invention, there is provided a scanning line alignment compensation method for a laser printer having a first laser diode and a second laser diode and at least one sync signal detection sensor that generates a sync signal based on at least one of the first laser diode and the second laser diode based on selectively driving either of the first laser diode and the second laser diode, and generates at least one offset sync signal having first and second sensor detection periods based on the sync signal generated based on the at least one of the first laser diode and the second laser diode, the method including generating the offset sync signal by the at least one sync signal detection sensor from a scanning light emitted from the first laser diode and the second laser diode; compensating for first and second video data synchronized with a video clock based on the first and second sensor detection periods; and outputting control signals to control the first laser diode and the second laser diode based on the compensated first and second video data.

Compensating for first and second video data includes calculating a first offset value, that is a difference between the first sensor detection period, which is based on driving both the first laser diode and the second laser diode and the second sensor detection period, which is based on the selective driving of the first laser diode and the second laser diode, based on a counting clock using an inverter; calculating a second offset value, which is a difference between the sync signal generated based on the at least one of the first laser diode and the second laser diode and the video clock, based on the counting clock; and compensating for a delay of the first and second video data based on the first offset value and the second offset value.

Further, to achieve the above and/or other aspects of the present invention, there is provided a scanning line alignment compensation apparatus for a laser printer, including a laser scanning unit having a first laser diode and a second laser diode, and generating a first sync signal and a second sync signal based respectively on light emitted by the first laser diode and the second laser diode, the first sync signal and the second sync signal respectively having a first sensor detection period and a second sensor detection period; a compensation unit receiving video data and using the first sensor detection period and the second sensor detection period to compensate for the video data; and a laser diode control unit controlling the first laser diode and the second laser diode based on the compensated for video data.

According to the embodiments of the present invention, the vertical error between the scanning lines generated due to the positional difference between the two laser diodes in the two-line optical scanning type laser printer can be compensated for.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 11 is a timing diagram illustrating compensation of first and second video data by the first and second offset values according to the second embodiment of the present invention shown in FIG. 7; and FIG. 12 is a flowchart illustrating a scanning line alignment compensation method for a laser printer according to the first and second embodiments of the present invention.

DETAILED DESCRIPTION OF THE PREFERRED EMBODIMENTS

Figure 1:
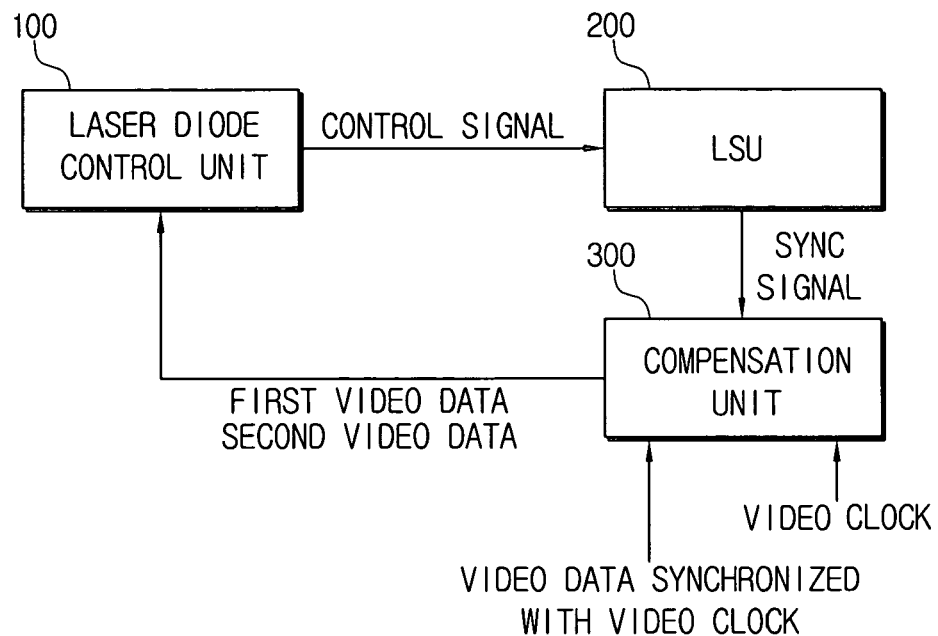
FIG. 1 is a block diagram of a scanning line alignment compensation apparatus for a laser printer according to a first embodiment and a second embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
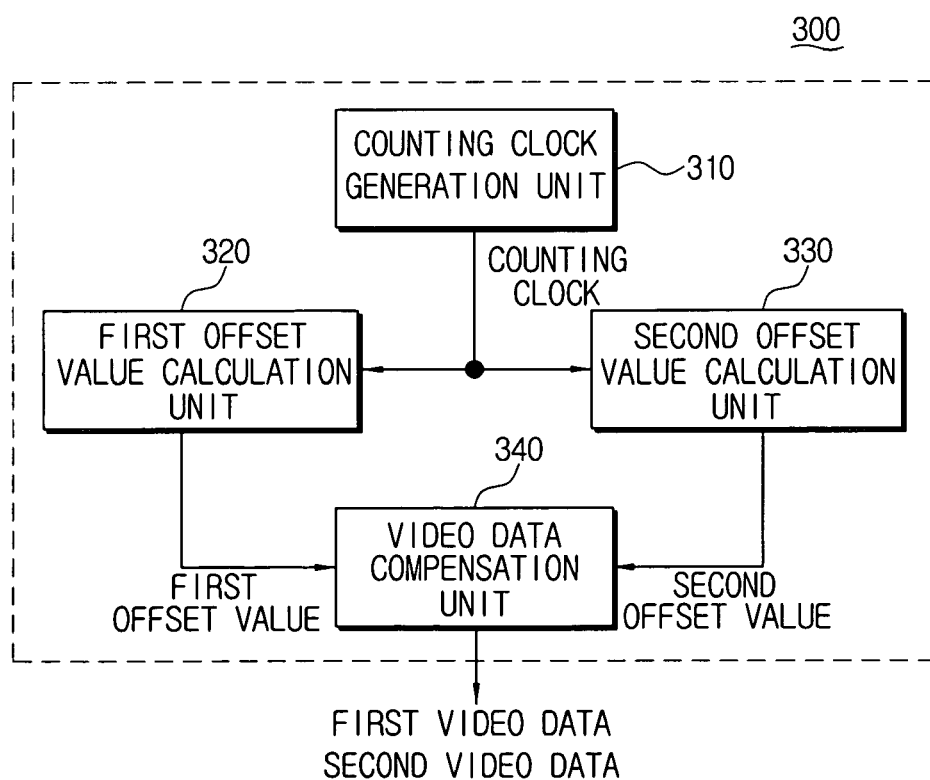
FIG. 2 is a block diagram of a compensation unit of the scanning line alignment compensation apparatus of FIG. 1.
Figure 3:
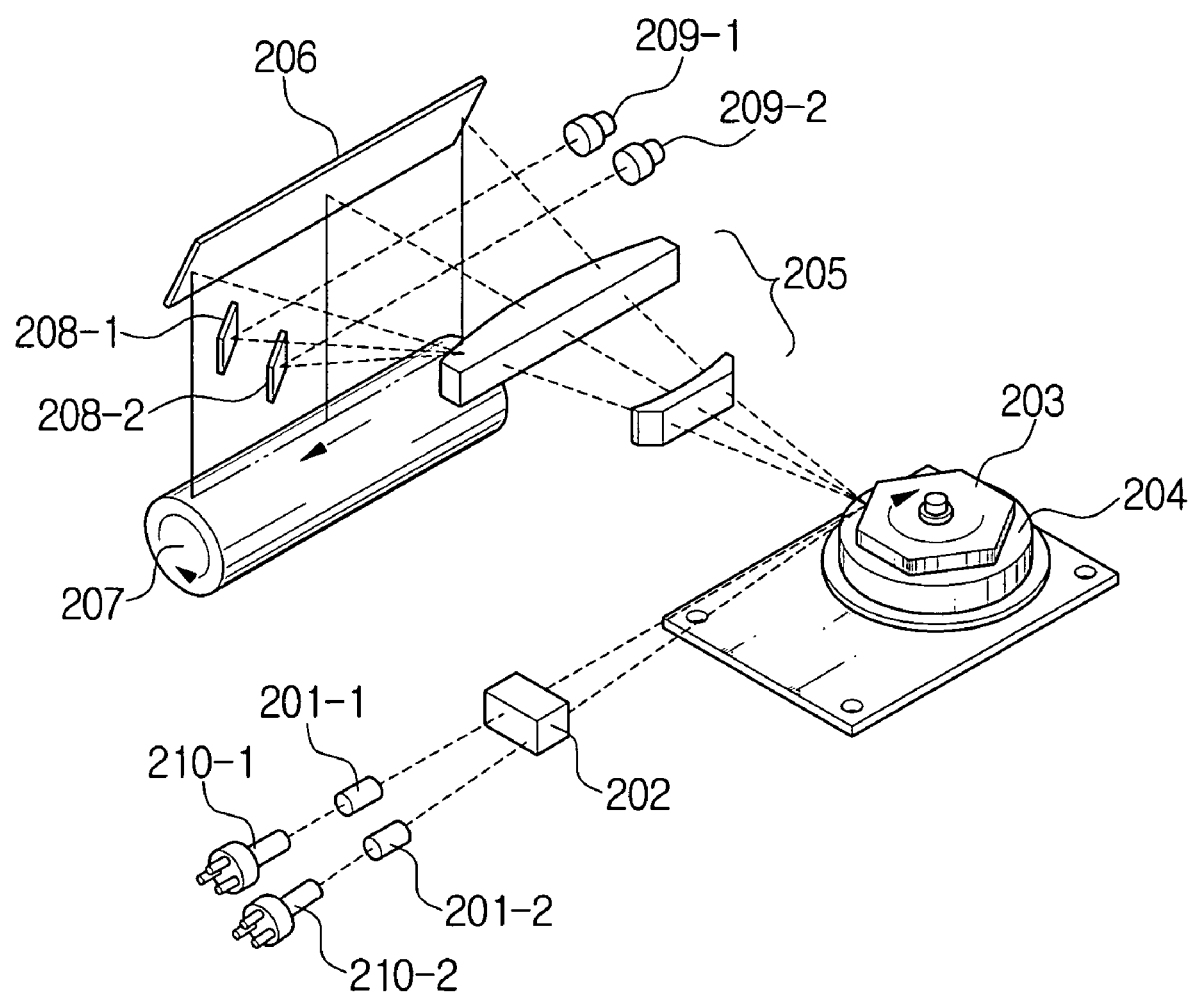
FIG. 3 is a perspective view of a laser scanning unit (LSU) according to the first embodiment of the present invention.

FIG. 1 is a block diagram of a scanning line alignment compensation apparatus for a laser printer according to a first embodiment of the present invention, and FIG. 2 is a block diagram of a compensation unit 300 shown in FIG. 1. FIG. 3 is a perspective view of a laser scanning unit (LSU) 200 shown in FIG. 1.

The scanning line alignment compensation apparatus of FIG. 1 includes a laser diode control unit 100, the LSU 200, and the compensation unit 300.

The laser diode control unit 100 receives first and second video data that are compensated for by first and second offset values from the compensation unit 300, and outputs control signals for controlling first and second laser diodes 210-1 and 210-2 of the LSU 200 based on the compensated first and second video data.

The LSU 200 is a laser scanning device, and includes the laser diodes 210-1 and 210-2, horizontal synchronous mirrors 208-1 and 208-2, and first and second sync signal detection sensors 209-1 and 209-2.

The first and second laser diodes 210-1 and 210-2 are controlled by the control signals output from the laser diode control unit 100. The first and second sync signal detection sensors 209-1 and 209-2 generate sync signals based on scanning lights output from the first and second laser diodes 210-1 and 210-2. The generated sync signals are output to the compensation unit 300.

Referring to FIG. 2, the compensation unit 300 includes a counting clock generation unit 310, a first offset value calculation unit 320, a second offset value calculation unit 330, and a video data compensation unit 340.

The counting clock generation unit 310 outputs a counting clock using an inverter. However, the counting clock generation unit 310 may use a ring oscillator clock. The output of the counting clock, by means of the counting clock generation unit 310 using the inverter, is well known in the art, and a detailed explanation thereof will be omitted.

The first offset value calculation unit 320 calculates a first offset value, which is based on a positional difference between the first and second laser diodes 210-1 and 210-2, using the counting clock.

The second offset value calculation unit 330 uses the counting clock to calculate a second offset value, which is a difference between a pulse period of the sync signal from the first laser diode 210-1 and a video clock.

The video data compensation unit 340 receives the first and second offset values, and compensates for the first and second video data. The compensated first and second video data are output to the laser diode control unit 100.

The LSU 200 is explained in detail with reference to FIG. 3.

The LSU 200 includes the laser diodes 210-1 and 210-2, collimator lenses 201-1 and 201-2, a cylinder lens 202, a polygon mirror 203, a motor 204, an fθ lens 205, the horizontal synchronous mirrors 208-1 and 208-2, and the first and second sync signal detection sensors 209-1 and 209-2.

The laser diodes 210-1 and 210-2 are used as light sources emitting light. The laser diodes 210-1 and 210-2 are controlled based on the control signals output from the laser diode control unit 100.

The collimator lenses 201-1 and 201-2 convert the lights emitted from the laser diodes 210-1 and 210-2 into parallel lights. The cylinder lens 202 converts the parallel lights from the collimator lenses 201-1 and 201-2 into linear lights in a horizontal direction with respect to a sub-scanning direction. Also, the polygon mirror 203, which is driven at a constant speed by the driving of the motor 204, moves and scans the linear lights in the horizontal direction from the cylinder lens 202 at a constant line speed. The fθ lens 205 has a constant refractive index with respect to an optical axis, and refracts the lights of the constant speed, which are refracted from the polygon mirror 203, in a main scanning direction. Also, the fθ lens 205 compensates for an aberration of the lights reflected from the polygon mirror 203 to focus the reflected lights on a scanning surface. A reflective mirror 206 reflects the lights passing through the fθ lens 205 in a specified direction to make the reflected lights incident to a surface of a photosensitive drum 207 that is an image-forming surface.

The horizontal synchronous mirrors 208-1 and 208-2 reflect the lights passing through the fθ lens 205 in the horizontal direction (i.e., to the sync signal detection sensors 209-1 and 209-2). In the embodiment of the present invention shown in FIG. 3, two horizontal synchronous mirrors 208-1 and 208-2 are provided.

The first and second sync signal detection sensors 209-1 and 209-2 respectively receive the lights reflected from the horizontal synchronous mirrors 208-1 and 208-2. The sync signals output from the first and second sync signal detection sensors 209-1 and 209-2 are used to match the scanning synchronization. In the embodiment of the present invention shown in FIG. 3, two sync signal detection sensors are provided (i.e., first sync signal detection sensor 209-1 and second sync signal detection sensor 209-2), corresponding respectively to the two horizontal sync mirrors 208-1 and 208-2.

In the LSU 200, a scanning line is formed by making the light reflected at a specified angle, in accordance with a surface angle of the polygon mirror 203, be incident to the photosensitive drum 207 in a main scanning direction. Also, another scanning line corresponding to the video data is formed in a sub-scanning direction that is perpendicular to the main scanning direction by use of the photosensitive drum 207.

The lights reflected from the horizontal synchronous mirrors 208-1 and 208-2 are respectively recognized by the first and second sync signal detection sensors 209-1 and 209-2, and then synchronized with each other. Thus, the scanning start positions of the respective scanning lines are kept constant, and forms an image with a small scanning line deviation.

Figure 4A:
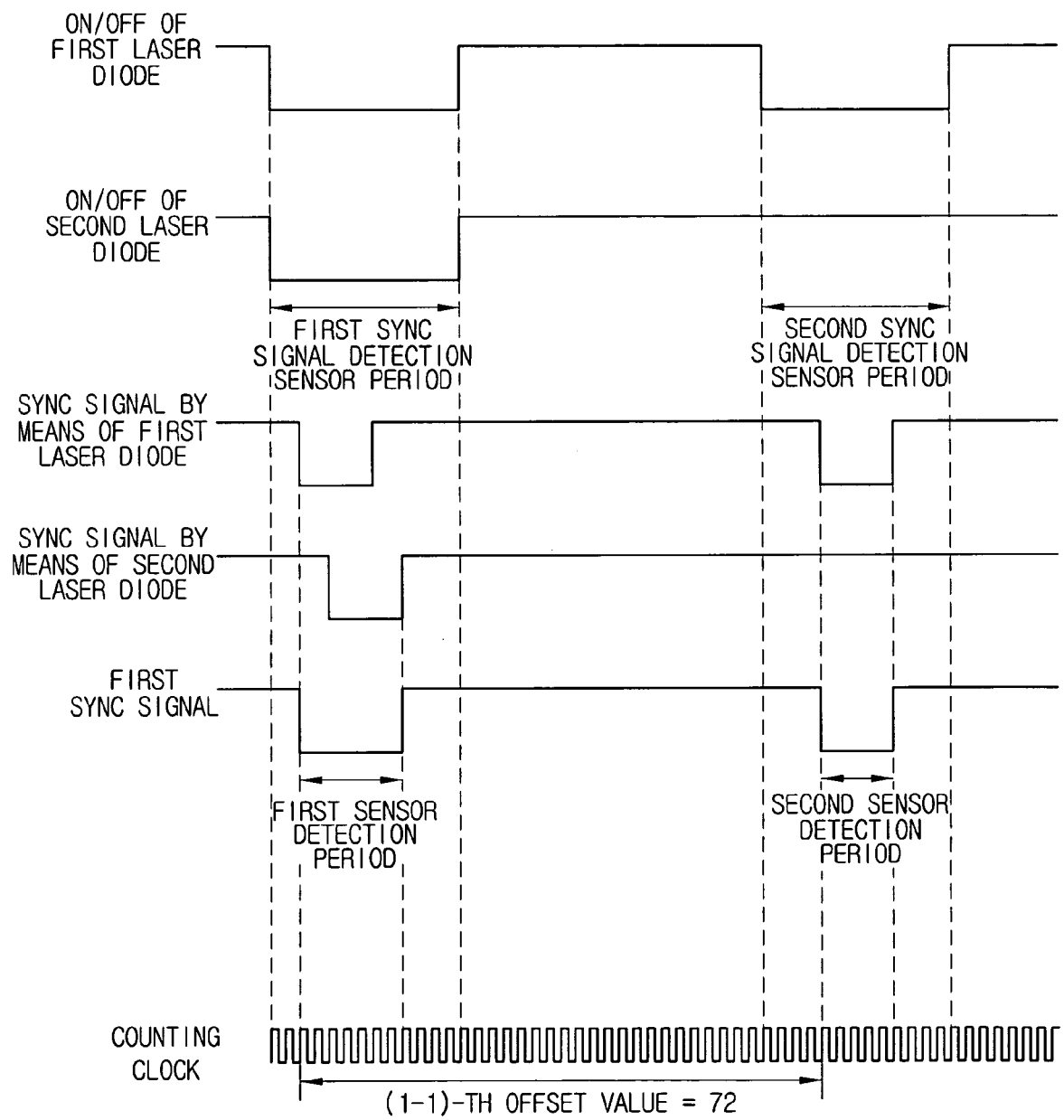
FIG. 4A is a timing diagram illustrating calculation of a (1-1)-th offset value according to the first embodiment of the present invention shown in FIG. 3.

FIG. 4A is a timing diagram illustrating the calculation of a (1-1)-th offset value according to the embodiment of the present invention shown in FIG. 3.

The first laser diode 210-1 is turned on/off to perform the alignment compensation, and the second laser diode 210-2 is also turned on/off to perform the alignment compensation. While the first and second laser diodes 210-1 and 210-2 are turned on, the lights are emitted from the first and second diodes 210-1 and 210-2.

To compensate for the vertical error, the on/off operations of the first and second laser diodes 210-1 and 210-2 are controlled. A preceding control period corresponding to the first sync signal detection sensor 209-1 is defined as a first sync signal detection sensor period, and a following control period corresponding to the second sync signal detection sensor 209-2 is defined as a second sync signal detection sensor period.

The sync signal generated based on the first laser diode 210-1 is generated using the first and/or second sync signal detection sensors 209-1 and 209-2 based on the light emitted from the first laser diode 210-1. The sync signal generated based on the second laser diode 210-2 is generated using the first and/or second sync signal detection sensors 209-1 and 209-2 based on the light emitted from the second laser diode 210-2.

The first sync signal is calculated based on the sync signals generated based on the first and second laser diodes 210-1 and 210-2. The respective sync signals described hereinafter are obtained by calculating the sync signals generated based on the first and second laser diodes 210-1 and 210-2 by using OR gates.

The preceding period of the pulse detected by the first sync signal detection sensor 209-1 is defined as a first sensor detection period, and the following period of the pulse detected by the second sync signal detection sensor 209-2 is defined as a second sensor detection period based on the lights emitted from the first and second laser diodes 210-1 and 210-2.

As shown in FIG. 4A, to compensate for the positions of the first and second laser diodes 210-1 and 210-2, sync signals generated based on the first and second laser diodes 210-1 and 210-2 are generated when the first and second laser diodes 210-1 and 210-2 are driven in the first sync signal detection sensor period. Also, the first sync signal, detected during the first sync signal detection sensor period, forms the first sensor detection period.

In the second sync signal detection sensor period, the sync signals generated based on the first and second laser diodes 210-1 and 210-2 are generated when the first laser diode 210-1 is driven and the second laser diode 210-2 is not driven. Also, the first sync signal, detected during the second sync signal detection sensor period, forms the second sensor detection period.

Then, the section between the start point of the first sensor detection period and the start point of the second sensor detection period is counted using the counting clock generated from the counting clock generation unit 310. The counted value is defined as a (1-1)-th offset value. In the embodiment of the present invention shown in FIG. 4A, the (1-1)-th offset value is 72.

Figure 4B:
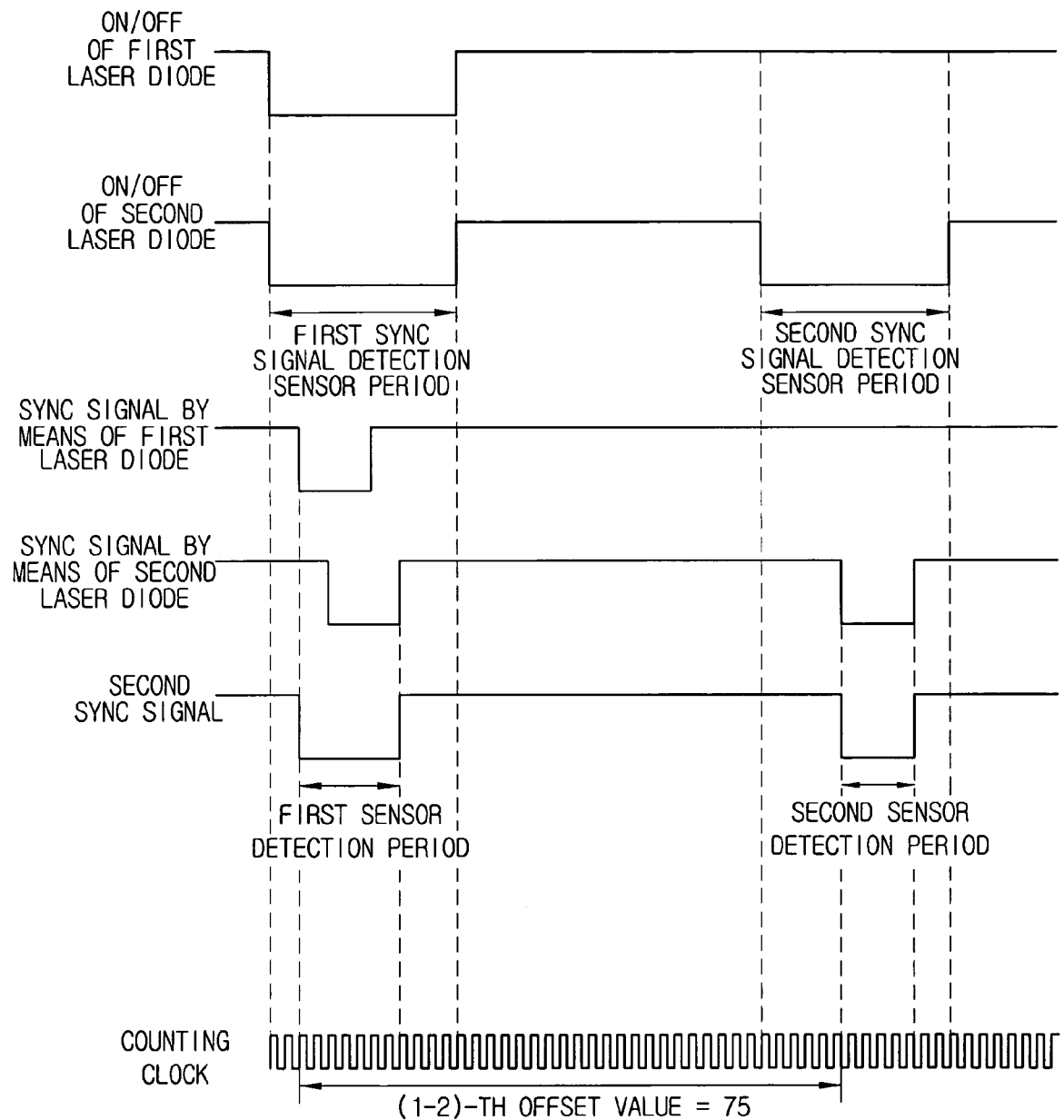
FIG. 4B is a timing diagram illustrating calculation of a (1-2)-th offset value according to the first embodiment of the present invention shown in FIG. 3.

FIG. 4B is a timing diagram illustrating calculation of a (1-2)-th offset value according to the embodiment of the present invention shown in FIG. 3.

The calculation of the second sync signal is similar to the calculation of the first sync signal as shown in FIG. 4A. However, the calculation of the second sync signal differs from the calculation of the first sync signal in that in the second sync signal detection sensor period, the sync signals generated using the first and second laser diodes 210-1 and 210-2 are generated when the second laser diode 210-2 is driven and the first laser diode 210-1 is not driven. Also, the second sensor detection period is formed.

Then, the section between the start point of the first sensor detection period and the start point of the second sensor detection period is counted using the counting clock generated by the counting clock generation unit 310. The count value is defined as a (1-2)-th offset value. In the embodiment of the present invention shown in FIG. 4B, the (1-2)-th offset value is 75.

The difference between the (1-1)-th offset value and the (1-2)-th offset value, as calculated above, is defined as the first offset value. In the embodiment of the present invention shown in FIGS. 4A and 4B, the first offset value is 3.

Figure 5:
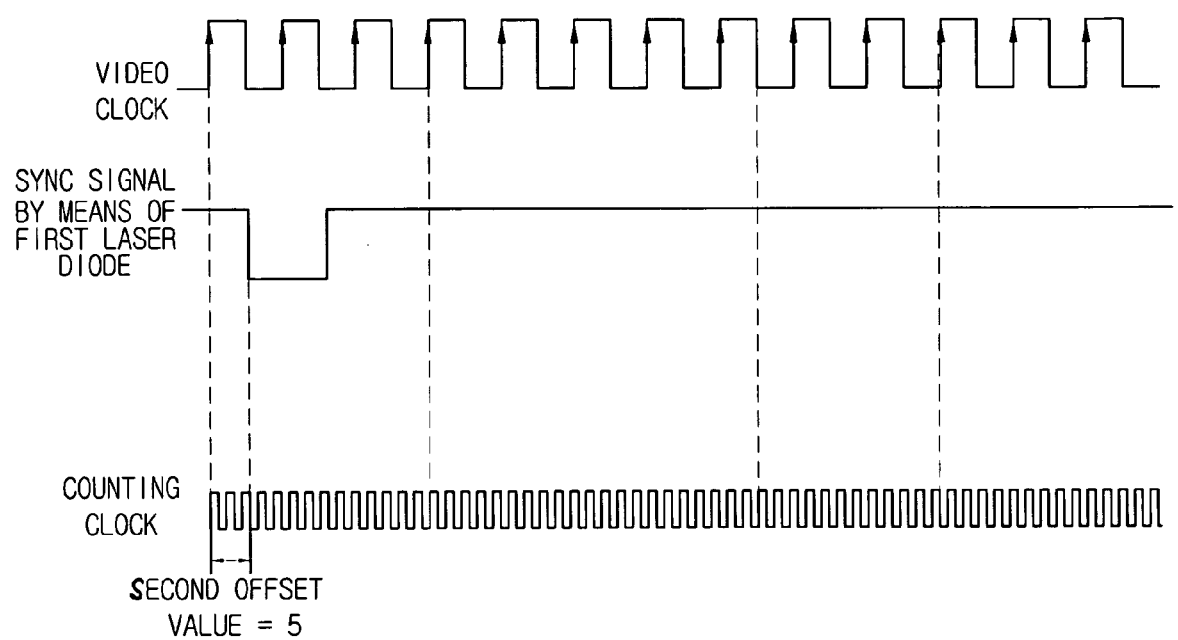
FIG. 5 is a timing diagram illustrating calculation of a second offset value according to the first embodiment of the present invention shown in FIG. 3.

FIG. 5 is a timing diagram illustrating the calculation of the second offset value according to the embodiment of the present invention shown in FIG. 3.

A video clock is output from a video clock unit (not illustrated), and is synchronized with the video data. Then, the video clock and the video data synchronized with the video clock are input to the compensation unit 300.

Then, the section between the start point of the video clock, as shown in FIG. 5, and the start point of the pulse period in the sync signal generated using the first laser diode 210-1 as described above, is counted using the counting clock generated from the counting clock generation unit 310. This counted value is defined as the second offset value. In the embodiment of the present invention shown in FIG. 5, the second offset value is 5.

Figure 6:
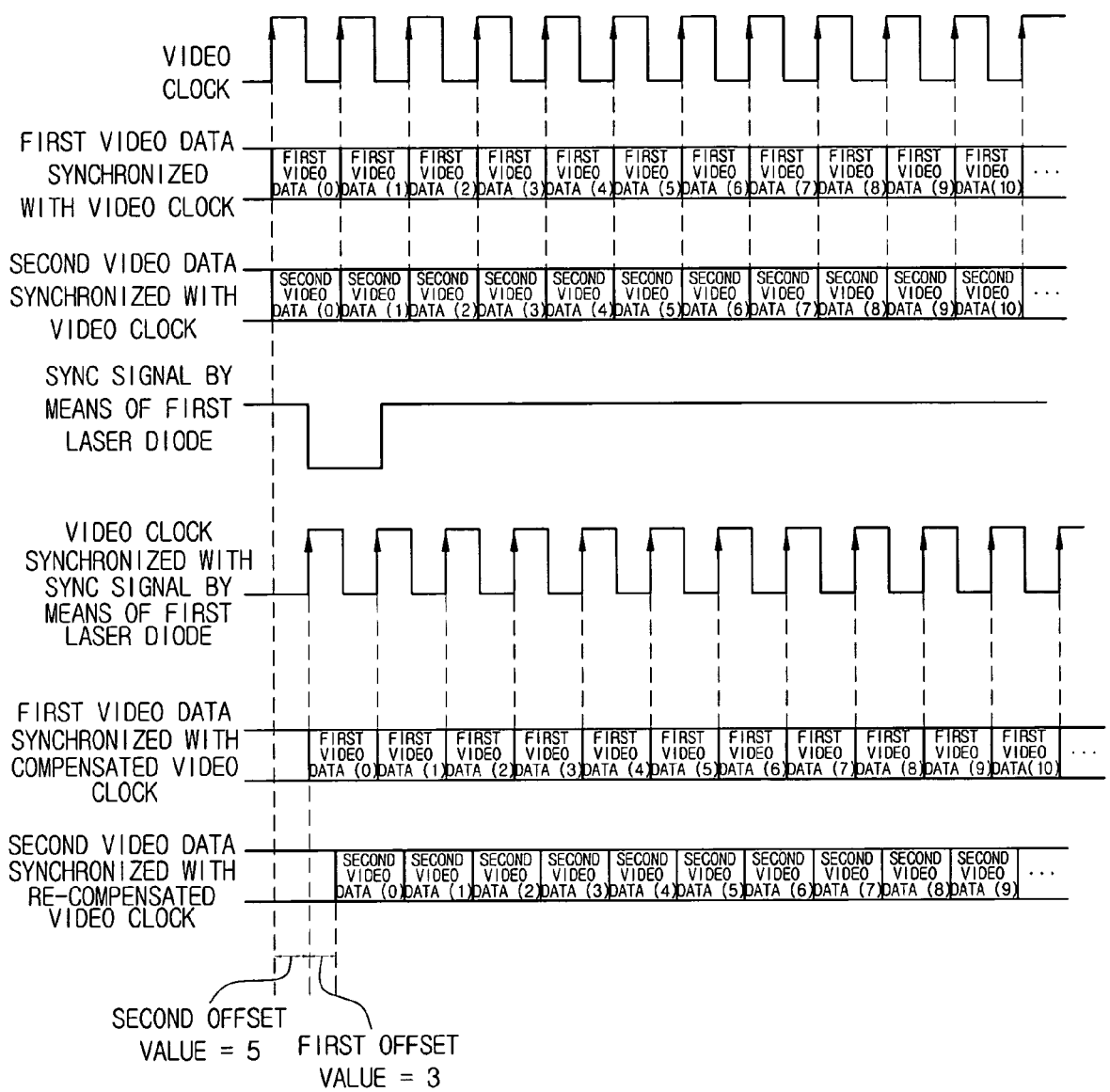
FIG. 6 is a timing diagram illustrating compensation of first and second video data by first and second offset values according to the first embodiment of the present invention shown in FIG. 3.

The operation of the scanning line alignment compensation apparatus and the alignment compensation method according to the first embodiment of the present invention is explained in greater detail referring to FIG. 6.

FIG. 6 is a timing diagram illustrating compensation of the first and second video data by the first and second offset values according to the first embodiment of the present invention shown in FIG. 3.

Alignment compensation of the scanning lines is performed before performing printing when the laser printer is operated by a user.

First, to generate the first sync signal, the lights are output in the first sync signal detection sensor period by driving the first and second laser diodes 210-1 and 210-2 in the LSU 200, and the first sensor detection period is detected using the first sync signal detection sensor 209-1, as described above. Then, in the second sync signal detection sensor period, which occurs after a specified time, the light is output by driving only the first laser diode 210-1, and the second sensor detection period is detected using the second sync signal detection sensor 209-2, as described above.

Then, to generate the second sync signal, the lights are output in the first sync signal detection sensor period by driving the first and second laser diodes 210-1 and 210-2, and the first sensor detection period is detected using the first sync signal detection sensor 209-1. Then, in the second sync signal detection sensor period, which occurs after a specified time, the light is output by driving only the second laser diode 210-2, and the second sensor detection period is detected using the second sync signal detection sensor 209-2, as described above.

Then, the first and second sync signals, which have second sensor detection periods that differ from each other, are output from the LSU 200 to the compensation unit 300, and the sync signal generated based on the first laser diode 210-1 is output to the compensation unit 300.

The first offset value calculation unit 320 of the compensation unit 300, which received the first and second sync signals, calculates the (1-1)-th offset value of 72 and the (1-2)-th offset value of 75 based on the first sensor detection period and the second sensor detection period in the first and second sync signals using the counting clock. Then, the first offset value calculation unit 320 calculates the first offset value of 3, and outputs the first offset value to the video data compensation unit 340.

Also, the second offset value calculation unit 330, which received the sync signal generated based on the first laser diode 210-1 and the video clock output from the video clock unit (not illustrated), calculates the second offset value of 5 based on the pulse period of the sync signal based on the first laser diode 210-1 and the video clock, and outputs the second offset value to the video data compensation unit 340.

The video data compensation unit 340 receives the first and second offset values, the video clock, and the first and second video data synchronized with the video clock.

Then, the video data compensation unit 340 compensates for the video clock based on the first and second offset values of 3 and 5, and compensates for the first and second video data synchronized with the compensated video clock.

The compensation procedure will now be explained in detail. First, the video clock is delayed by the second offset value of 5. The first video data are synchronized and compensated for based on the delayed video clock. That is, the input first video data are delayed by the second offset value of 5.

Then, the video clock, which has been delayed by the second offset value of 5, is delayed again by the first offset value of 3. The second video data are synchronized and compensated for based on the video clock being delayed again. That is, the input second video data are delayed by the first and second offset values of 3 and 5.

The compensated first and second video data are output to the laser diode control unit 100. The laser diode control unit 100 calculates the control signal based on the compensated first and second video data. The calculated control signal is transmitted to the LSU 200, and adjusts the light output from the first and second laser diodes 210-1 and 210-2. Accordingly, the vertical alignment error between the scanning lines due to the positional difference between the laser diodes 210-1 and 210-2 is compensated for.

Figure 7:
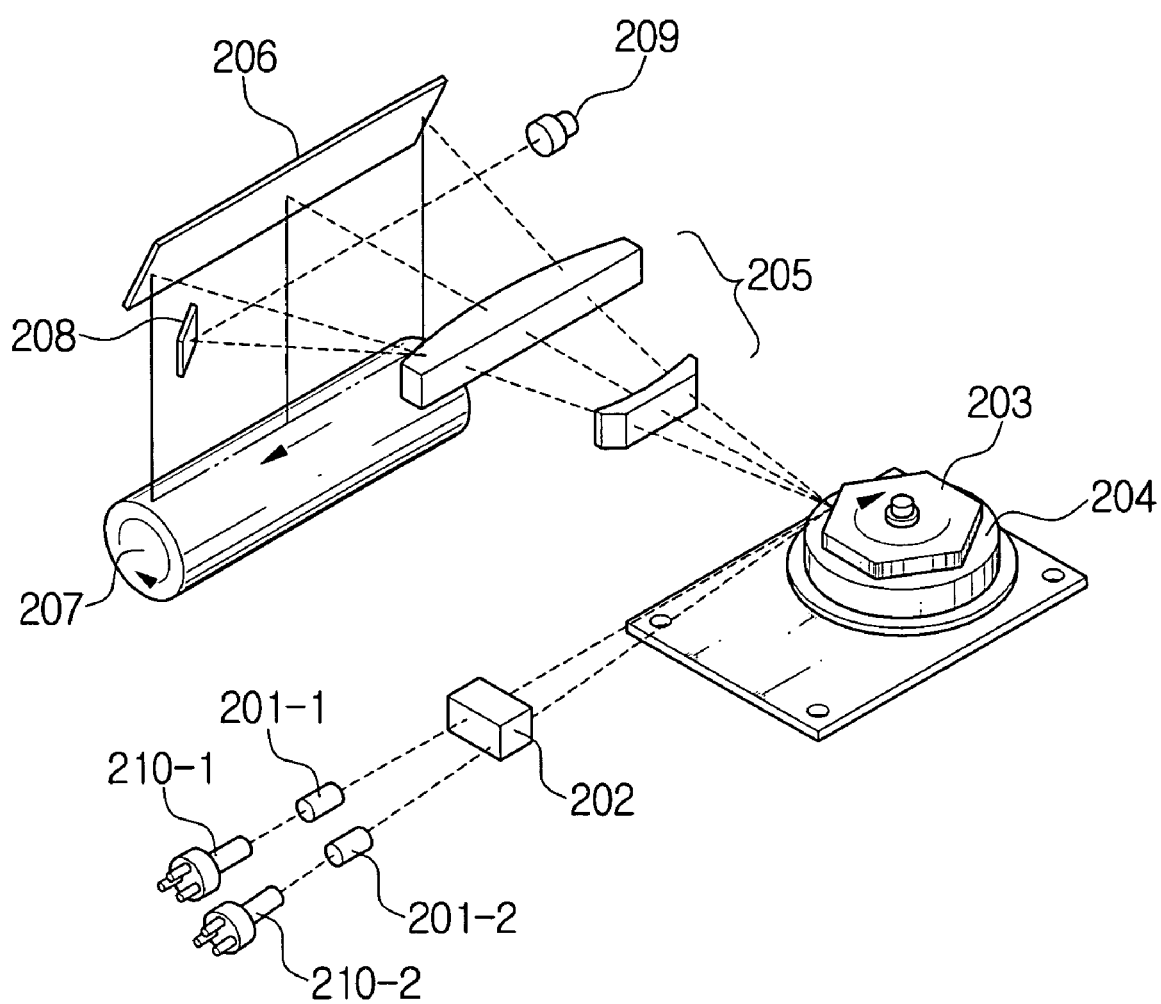
FIG. 7 is a perspective view of an LSU according to a second embodiment of the present invention.
Figure 8:
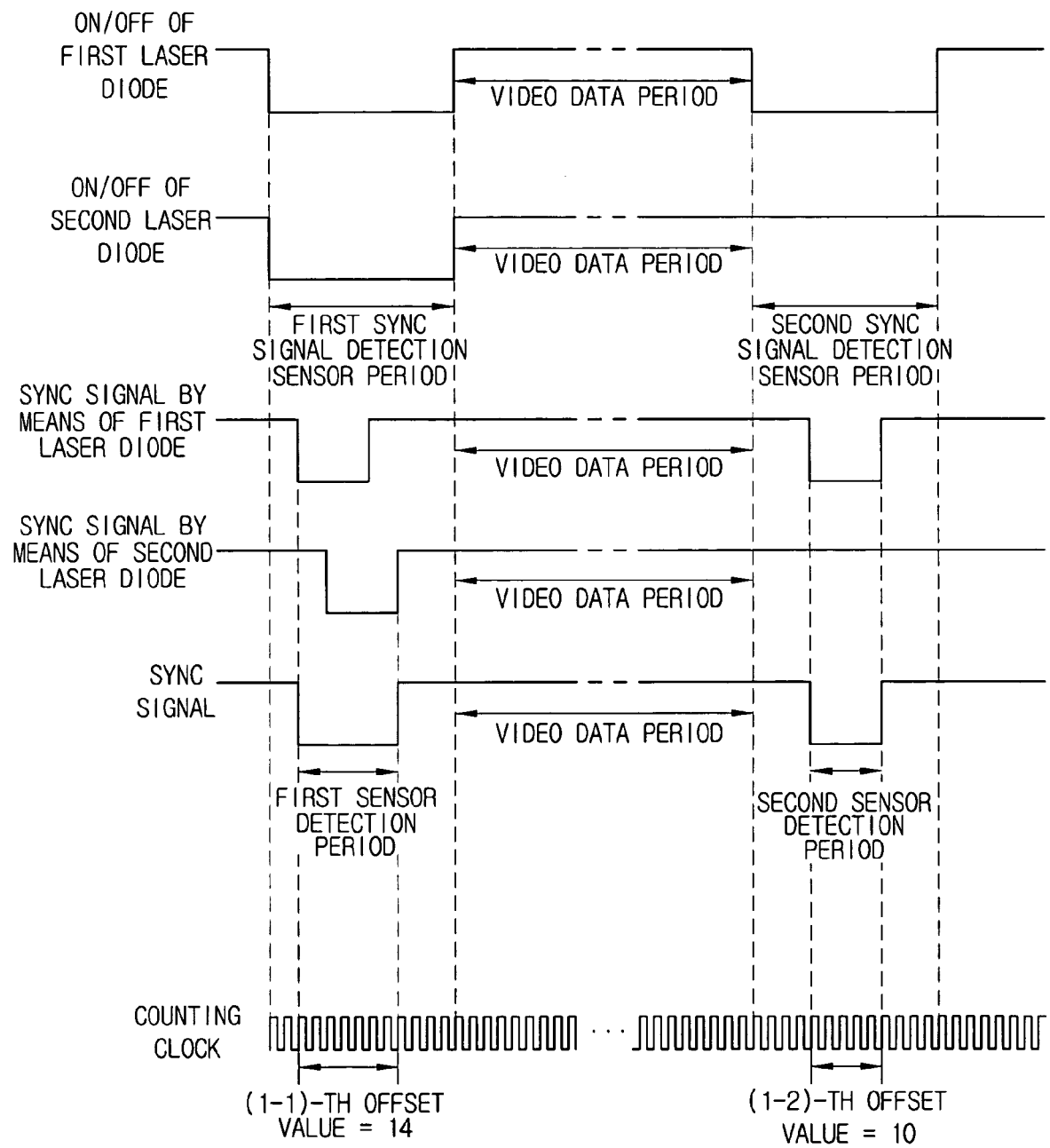
FIG. 8 is a timing diagram illustrating calculation of (1-1)-th and (1-2)-th offset values according to a first aspect of the second embodiment of the present invention shown in FIG. 7.

FIG. 7 is a perspective view of the LSU 200 according to a second embodiment of the present invention. FIG. 8 is a timing diagram illustrating calculation of the (1-1)-th and (1-2)-th offset values according to the second embodiment of the present invention shown in FIG. 7.

Figure 9A:
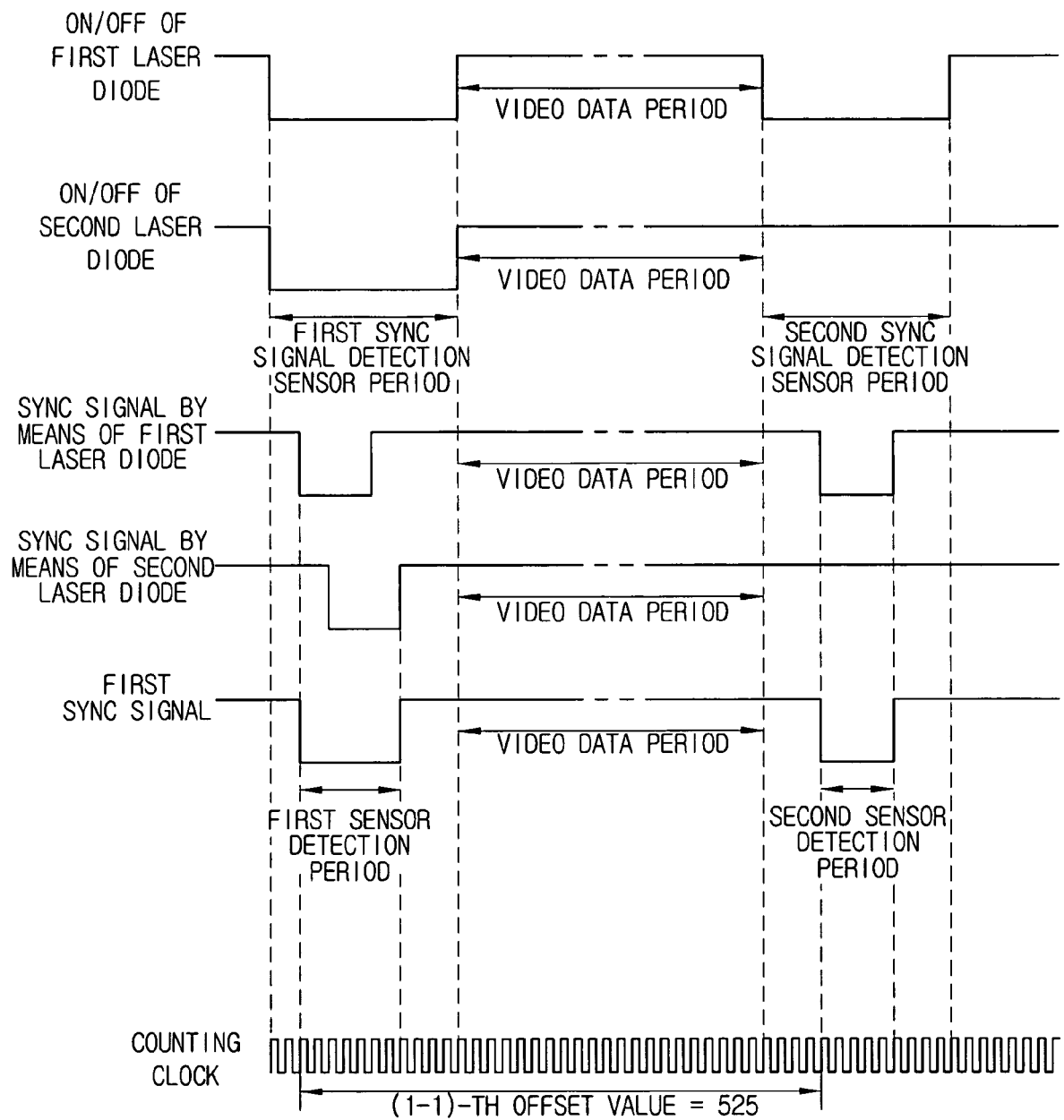
FIG. 9A is a timing diagram illustrating calculation of the (1-1)-th offset value according to a second aspect of the second embodiment of the present invention shown in FIG. 7.
Figure 9B:
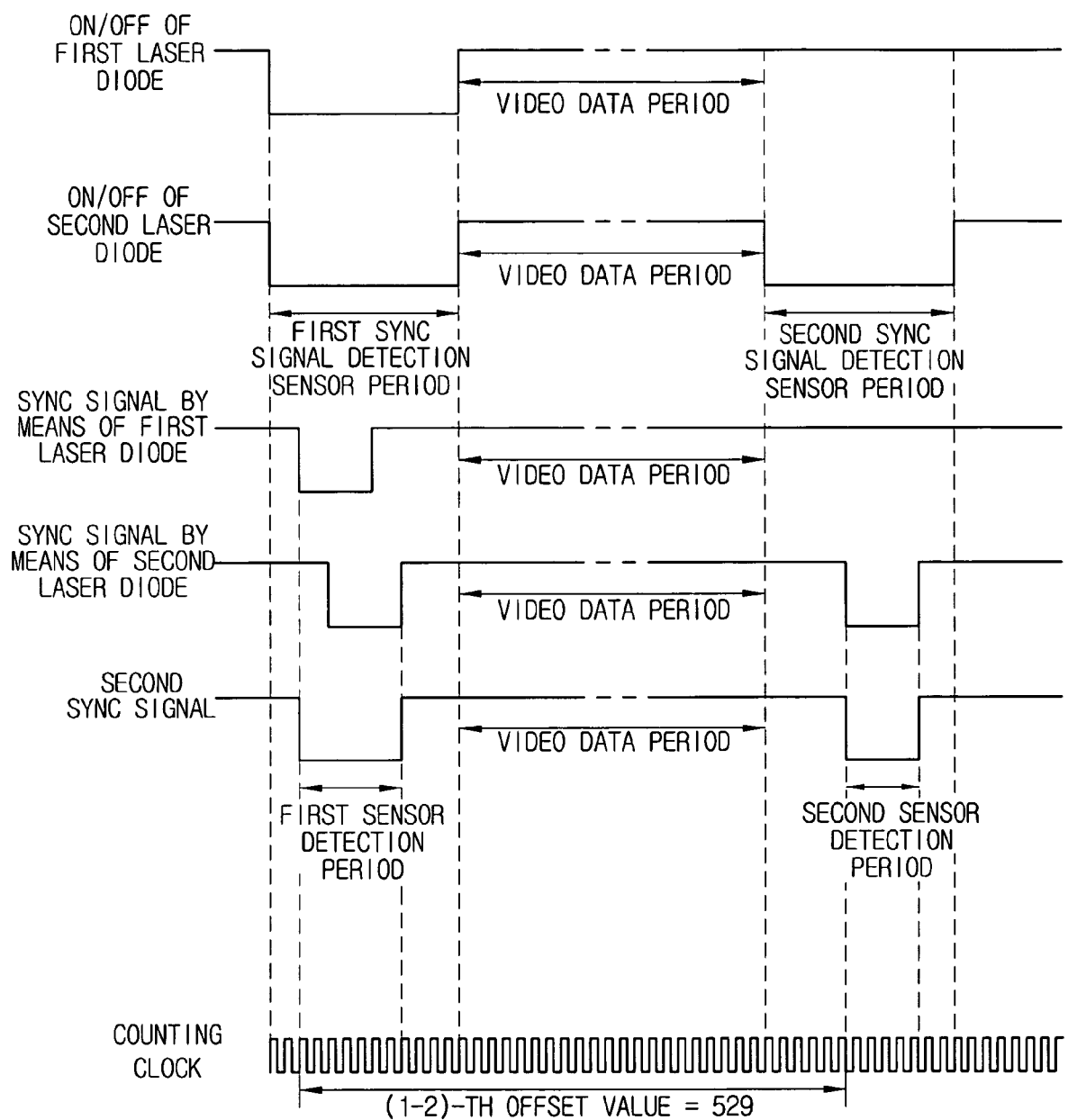
FIG. 9B is a timing diagram illustrating calculation of the (1-2)-th offset value according to the second aspect of the second embodiment of the present invention.

FIGS. 9A and 9B are timing diagrams illustrating calculation of the (1-1)-th offset value and the (1-2)-th offset value, respectively, according to an aspect of the second embodiment of the present invention shown in FIG. 7, which differs from the aspect of the second embodiment shown in FIG. 8.

Differences between the second embodiment and the first embodiment shown in FIG. 3 are explained below.

In the first embodiment shown in FIG. 3, two sync signal detection sensors 209-1 and 209-2 are used, but the embodiment shown in FIG. 7 uses only one sync signal detection sensor 209. Accordingly, only one horizontal synchronous mirror 208 is provided.

Also, in the embodiment shown in FIG. 3, the first offset value is calculated by generating the first and second sync signals, but in the embodiment shown in FIG. 7, the first offset value is calculated by generating only one sync signal as shown in FIG. 8, while the first offset value is calculated by generating the first and second sync signals, as shown in FIGS. 9A and 9B.

Also, the first and second sync signal detection sensor periods in the embodiment shown in FIGS. 4A and 4B have different meanings from the first and second sync signal detection sensor periods in the embodiments shown in FIG. 8 and in FIGS. 9A and 9B. That is, in FIGS. 4A and 4B, because two neighboring sync signal detection sensors 209-1 and 209-2 are provided, the first and second sync signal detection sensor periods are provided in the same line, and the first sync signal detection sensor period corresponds to the first sync signal detection sensor 209-1, while the second sync signal detection sensor period corresponds to the second sync signal detection sensor 209-2. However, in FIG. 8 and in FIGS. 9A and 9B, because only one sync signal detection sensor 209 is provided, the first sync signal detection sensor period corresponds to the sync signal detection sensor 209 in the preceding line, and the second sync signal detection sensor period corresponds to the sync signal detection sensor 209 in the following line (i.e., the next line).

Referring to FIG. 8, the offset value calculation will be explained. To correspond to FIGS. 4A and 4B, the video data period is simply illustrated, and the same procedures described with reference to FIGS. 4A and 4B will be omitted.

The first sync signal detection sensor period is a period for the sync signal detection sensor 209 in the preceding line, and the second sync signal detection sensor period is a period for the sync signal detection sensor 209 in the following line.

The sync signal generated using the first laser diode 210-1 is generated using the sync signal detection sensor 209 based on the light emitted from the first laser diode 210-1. The sync signal generated using the second laser diode 210-2 is generated using the sync signal detection sensor 209 based on the light emitted from the second laser diode 210-2.

As shown in FIG. 8, to compensate for the positions of the first and second laser diodes 210-1 and 210-2, sync signals generated using the first and second laser diodes 210-1 and 210-2 are generated when the first and second laser diodes 210-1 and 210-2 are respectively driven in the first sync signal detection sensor period. Also, the sync signal, which forms the first sensor detection period, is detected.

In the second sync signal detection sensor period, the sync signals generated using the first and second laser diodes 210-1 and 210-2 are generated when the first laser diode 210-1 is driven and the second laser diode 210-2 is not driven. Also, the sync signal, which forms the second sensor detection period, is detected.

Then, the first sensor detection period is counted using the counting clock generated from the counting clock generation unit 310. The counted result is defined as a (1-1)-th offset value. In the embodiment shown in FIG. 8, the (1-1)-th offset value is 14.

Then, the second sensor detection period is counted using the counting clock generated from the counting clock generation unit 310. The counted result is defined as a (1-2)-th offset value. In the embodiment shown in FIG. 8, the (1-2)-th offset value is 10.

The difference between the (1-1)-th offset value and the (1-2)-th offset value as calculated above is defined as the first offset value. In the embodiment shown in FIG. 8, the first offset value is 4.

Referring to FIG. 9A, to compensate for the positions of the first and second laser diodes 210-1 and 210-2, sync signals generated using the first and second laser diodes 210-1 and 210-2 are generated when the first and second laser diodes 210-1 and 210-2 are driven in the first sync signal detection sensor period. Also, the first sync signal, which forms the first sensor detection period, is detected.

In the second sync signal detection sensor period, the sync signals generated using the first and second laser diodes 210-1 and 210-2 are generated when the first laser diode 210-1 is driven and the second laser diode 210-2 is not driven. The first sync signal, which forms the second sensor detection period, is detected.

Then, the section between the start point of the first sensor detection period and the start point of the second sensor detection period is counted using the counting clock generated from the counting clock generation unit 310. The difference is defined as a (1-1)-th offset value, and the (1-1)-th offset value is 525 in the embodiment shown in FIG. 9A.

Referring to FIG. 9B, the calculation of the second sync signal is similar to the calculation of the first sync signal as shown in FIG. 9A. However, the calculation of the second sync signal differs from the calculation of the first sync signal in that in the second sync signal detection sensor period, the sync signals generated using the first and second laser diodes 210-1 and 210-2 are generated when the second laser diode 210-2 is driven and the first laser diode 210-1 is not driven. Then, the second sensor detection period is formed.

Then, the section between the start point of the first sensor detection period and the start point of the second sensor detection period is counted using the counting clock generated from the counting clock generation unit 310. The difference is defined as a (1-2)-th offset value. In the embodiment shown in FIG. 9B, the (1-2)-th offset value is 529.

The difference between the (1-1)-th offset value and the (1-2)-th offset value as calculated above is defined as the first offset value. In the embodiment shown in FIGS. 9A and 9B, the first offset value is 4.

Figure 10:
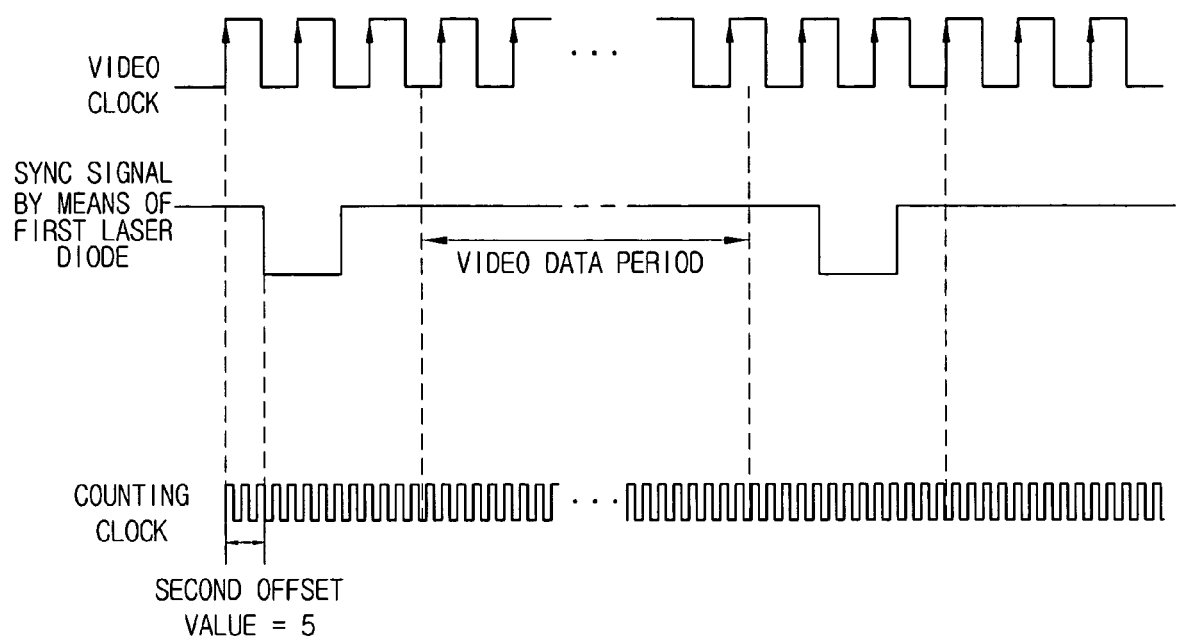
FIG. 10 is a timing diagram illustrating calculation of a second offset value according to the second embodiment of the present invention shown in FIG. 7.

FIG. 10 is a timing diagram illustrating the calculation of the second offset value according to the second embodiment of the present invention shown in FIG. 7.

As shown in FIG. 10, the section between the start point of the video clock and the start point of the preceding pulse period in the sync signal generated using the first laser diode 210-1 is counted using the counting clock generated from the counting clock generation unit 310. This counted value is defined as the second offset value. In the embodiment shown in FIG. 10, the second offset value is 5.

FIG. 11 is a timing diagram illustrating the calculation of the first and second video data compensated for by the first and second offset values according to the second embodiment of the present invention shown in FIG. 7.

The operation of the alignment compensation apparatus and the alignment compensation method according to the second embodiment of the present invention will be explained in detail with reference to FIG. 11.

First, referring to FIG. 8, the sync signal having the first and second sensor detection periods is generated and output to the compensation unit 300. The first offset value calculation unit 320 of the compensation unit 300, which received the sync signal, calculates the (1-1)-th offset value of 14 and the (1-2)-th offset value of 10 based on the first sensor detection period and the second sensor detection period in the sync signal using the counting clock. Then, the first offset value calculation unit 320 calculates the first offset value of 4, which is the difference between the (1-1)-th offset value and the (1-2)-th offset value, and outputs the first offset value to the video data compensation unit 340.

Alternatively, referring to FIGS. 9A and 9B, the first and second sync signals, which have different second sensor detection periods, are generated and output to the compensation unit 300. The first offset value calculation unit 320 of the compensation unit 300, which received the first and second sync signals, calculates the (1-1)-th offset value of 525 and the (1-2)-th offset value of 529 based on the first sensor detection period and the second sensor detection period in the first and second sync signals using the counting clock. The first offset value calculation unit 320 calculates and outputs the first offset value of 4, which is the difference between the (1-1)-th offset value and the (1-2)-th offset value, to the video data compensation unit 340.

The calculation procedure for the second offset value and the procedure of compensating for the first and second video data based on the first and second offset values are the same as those described with reference to FIG. 6, and, thus, the explanation thereof will be omitted.

Accordingly, the vertical alignment error between the two scanning lines due to the positional difference between the first and second laser diodes 210-1 and 210-2 is compensated for based on the compensated first and second video data.

FIG. 12 is a flowchart illustrating a scanning line alignment compensation method for a laser printer according to the first and second embodiments of the present invention.

Referring to FIG. 12, the alignment compensation method will be explained.

First, the lights are emitted from the first and second laser diodes 210-1 and 210-2 in the LSU 200 (step S410). The lights emitted from the first and second laser diodes 210-1 and 210-2 are detected using the sync signal detection sensors 209, 209-1, and 209-2 provided in the LSU 200 to generate the sync signals. As described above, one or two sync signals may be generated (step S420). The sync signals are input to the first and second offset value calculation units 320 and 330 to calculate the first and second offset values. To calculate the second offset value, the video clock is also input to the second offset value calculation unit 330 (step S430). The calculated first and second offset values are input to the video data compensation unit 340, and the first and second video data are compensated for using the input first and second offset values. Specifically, the first video data are compensated for by the second offset value, and the second video data are compensated for by the first and second offset values (step S440). The compensated first and second video data are output to the laser diode control unit 100, and the laser diode control unit 100 outputs the control signals corresponding to the compensated first and second video data to the LSU 200. The output control signals control the light emission from the first and second laser diodes 210-1 and 210-2 of the LSU 200 (step S450).

As described above, according to the scanning line alignment compensation apparatus and method according to the present invention, the vertical error between the scanning lines generated due to the positional difference between the two laser diodes in the two-line optical scanning laser printer can be compensated for. Accordingly, the misalignment of printed lines, which is a problem occurring in the two-line type laser printer, can be solved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A scanning line alignment compensation apparatus for a laser printer, comprising:
 a laser scanning unit (LSU) having a first laser diode and a second laser diode and at least one sync signal detection sensor that generates a sync signal based on at least one of the first laser diode and the second laser diode based on selectively driving either of the first laser diode and the second laser diode, and generates at least one offset sync signal having first and second sensor detection periods based on the sync signal generated based on the at least one of the first laser diode and the second laser diode;
 a compensation unit compensating for first and second video data input in synchronization with a video clock based on the first and second sensor detection periods; and
 a laser diode control unit outputting control signals to control the first laser diode and the second laser diode based on the compensated first and second video data.

2. The apparatus of claim 1, wherein the compensation unit comprises:
 a counting clock generation unit generating a counting clock using an inverter;
 a first offset value calculation unit using the counting clock to calculate a first offset value that is a difference between the first sensor detection period, which is based on driving both the first laser diode and the second laser diode, and the second sensor detection period, which is based on the selective driving of the first laser diode and the second laser diode;
 a second offset value calculation unit using the counting clock to calculate a second offset value, which is a difference between the sync signal generated based on the at least one of the first laser diode and the second laser diode and the video clock; and
 a video data compensation unit compensating for a delay of the first and second video data based on the first offset value and the second offset value.

3. The apparatus of claim 2, wherein the at least one sync signal detection sensor comprises two sync signal detection sensors, and the first offset value is calculated by
 obtaining a (1-1)-th offset value by counting a difference between a start point of the first sensor detection period and a start point of the second sensor detection period, based on the driving of only the first laser diode, and
 obtaining a (1-2)-th offset value by counting a difference between a start point of the first sensor detection period and a start point of the second sensor detection period, based on the driving of only the second laser diode.

4. The apparatus of claim 2, wherein the at least one sync signal detection sensor comprises one sync signal detection sensor, and the first offset value is calculated by
 obtaining a (1-1)-th offset value by counting the first sensor detection period, and obtaining a (1-2)-th offset value by counting the second sensor detection period, based on driving either of the first laser diode and the second laser diode.

5. The apparatus of claim 2, wherein the at least one sync signal detection sensor comprises one sync signal detection sensor, and the first offset value is calculated by obtaining a (1-1)-th offset value by counting a difference between a start point of the first sensor detection period and a start point of the second sensor detection period, based on the driving of only the first laser diode, and obtaining a (1-2)-th offset value by counting a difference between a start point of the first sensor detection period and a start point of the second sensor detection period, based on the driving of only the second laser diode.

6. The apparatus of claim 2, wherein the first video data are compensated for based on compensating for the video clock by the second offset value, and the second video data are compensated for based on compensating for the video clock by the first offset value and the second offset value.

7. A scanning line alignment compensation method for a laser printer having a first laser diode and a second laser diode and at least one sync signal detection sensor that generates a sync signal based on at least one of the first laser diode and the second laser diode based on selectively driving either of the first laser diode and the second laser diode, and generates at least one offset sync signal having first and second sensor detection periods based on the sync signal generated based on the at least one of the first laser diode and the second laser diode, the method comprising:

generating the offset sync signal by the at least one sync signal detection sensor from a scanning light emitted from the first laser diode and the second laser diode;

compensating for first and second video data synchronized with a video clock based on the first and second sensor detection periods; and outputting control signals to control the first laser diode and the second laser diode based on the compensated first and second video data.

8. The method of claim 7, wherein said compensating for first and second video data comprises:

calculating a first offset value, that is a difference between the first sensor detection period, which is based on driving both the first laser diode and the second laser diode and the second sensor detection period, which is based on the selective driving of the first laser diode and the second laser diode, based on a counting clock using an inverter;

calculating a second offset value, which is a difference between the sync signal generated based on the at least one of the first laser diode and the second laser diode and the video clock, based on the counting clock; and compensating for a delay of the first and second video data based on the first offset value and the second offset value.

9. The method of claim 8, further comprising, when the at least one sync signal detection sensor comprises two sync signal detection sensors, calculating the first offset value by obtaining a (1-1)-th offset value by counting a difference between a start point of the first sensor detection period and a start point of the second sensor detection period, based on the driving of only the first laser diode, and obtaining a (1-2)-th offset value by counting a difference between a start point of the first sensor detection period and a start point of the second sensor detection period, based on the driving of only the second laser diode.

10. The method of claim 8, further comprising, when the at least one sync signal detection sensor comprises one sync signal detection sensor, calculating the first offset value by obtaining a (1-1)-th offset value by counting the first sensor detection period, and obtaining a (1-2)-th offset value by counting the second sensor detection period, based on driving either of the first laser diode and the second laser diode.

11. The method of claim 8, further comprising, when the at least one sync signal detection sensor comprises one sync signal detection sensor, calculating the first offset value by obtaining a (1-1)-th offset value by counting a difference between a start point of the first sensor detection period and a start point of the second sensor detection period, based on the driving of only the first laser diode, and obtaining a (1-2)-th offset value by counting a difference between a start point of the first sensor detection period and a start point of the second sensor detection period, based on the driving of only the second laser diode.

12. The method of claim 8, further comprising compensating for the first video data based on compensating for the video clock by the second offset value, and compensating for the second video data based on compensating for the video clock by the first offset value and the second offset value.

13. A scanning line alignment compensation apparatus for a laser printer, comprising:

a laser scanning unit having a first laser diode and a second laser diode, and generating a first sync signal and a second sync signal based respectively on light emitted by the first laser diode and the second laser diode, the first sync signal and the second sync signal respectively having a first sensor detection period and a second sensor detection period;

a compensation unit receiving video data and using the first sensor detection period and the second sensor detection period to compensate for the video data; and a laser diode control unit controlling the first laser diode and the second laser diode based on the compensated for video data;

wherein the laser scanning unit further comprises a first sync signal detection sensor and a second sync signal detection sensor corresponding respectively to the first laser diode and the second laser diode, the first sync signal detection sensor and the second sync signal detection sensor respectively generating a sync signal based on the first laser diode and a sync signal based on the second laser diode;

wherein the compensation unit comprises:

a first offset value calculation unit receiving the first sync signal and the second sync signal and calculating a first offset value based on a positional difference between the first laser diode and the second laser diode;

a second offset value calculation unit receiving the sync signal based on the first laser diode and calculating a second offset value based on a difference between a pulse period of the sync signal based on the first laser diode and a video clock signal input to the compensation unit; and a video data compensation unit receiving the first offset value and the second offset value and compensating for a vertical error between scanning lines generated due to a positional difference between the first laser diode and the second laser diode.

14. The apparatus of claim 13, wherein:

the first offset value is calculated by determining, for both the first sync signal and the second sync signal, a difference between a starting point of the first sensor detection period and a starting point of the second sensor detection period, and subtracting the two differences; and the second offset value is calculated by determining a difference between a starting point of the sync signal generated based on the first laser diode and the video clock.

15. The apparatus of claim 13, wherein;

the video data comprise first video data and second video data;

the video data compensation unit compensates for the vertical error between scanning lines by delaying the first video data by the second offset value and delaying the second video data by both the first offset value and the second offset value; and the laser diode control unit receives the compensated for first video data and second video data, generates a control signal based on the compensated for first video data and second video data, and sends the control signal to the laser scanning unit to adjust the light output from the first laser diode and the second laser diode.

16. A scanning line alignment compensation apparatus for a laser printer, comprising:

a laser scanning unit having a first laser diode and a second laser diode, and generating a first sync signal and a second sync signal based respectively on light emitted by the first laser diode and the second laser diode, the first sync signal and the second sync signal respectively having a first sensor detection period and a second sensor detection period;

a compensation unit receiving video data and using the first sensor detection period and the second sensor detection period to compensate for the video data; and a laser diode control unit controlling the first laser diode and the second laser diode based on the compensated for video data;

wherein the first sensor detection period of the first sync signal is generated by driving both the first laser diode and the second laser diode, and the second sensor detection period of the first sync signal is generated by driving only the first laser diode; and the first sensor detection period of the second sync signal is generated by driving both the first laser diode and the second laser diode, and the second sensor detection period of the second sync signal is generated by driving only the second laser diode.

* * * * *